United States Patent [19]

Müller

[11] Patent Number: 4,603,367
[45] Date of Patent: Jul. 29, 1986

[54] POWER SUPPLY FOR OVERCURRENT CIRCUIT TRIP SYSTEM

[75] Inventor: Bernhard Müller, Berlin, Fed. Rep. of Germany

[73] Assignee: Siemens Aktiengesellschaft, Munich and Berlin, Fed. Rep. of Germany

[21] Appl. No.: 646,436

[22] Filed: Aug. 30, 1984

[30] Foreign Application Priority Data

Sep. 1, 1983 [DE] Fed. Rep. of Germany ....... 3331823

[51] Int. Cl.⁴ ............................................. H02H 3/00
[52] U.S. Cl. ..................................... 361/98; 361/100; 323/224
[58] Field of Search ........................... 361/93, 98, 100; 323/281, 224

[56] References Cited

U.S. PATENT DOCUMENTS 4,176,386 11/1979 Chow ...................................... 361/93
4,271,447 6/1981 Howell .
4,274,121 6/1981 Howell .
4,393,431 7/1983 Gilker ............................... 361/93 X
4,443,828 4/1984 Legrand et al. ..................... 361/93

FOREIGN PATENT DOCUMENTS 558098 11/1973 Switzerland .
2054296 2/1981 United Kingdom .

Primary Examiner—G. P. Tolin
Assistant Examiner—Jeffrey A. Gaffin
Attorney, Agent, or Firm—F. W. Powers; J. L. James

[57] ABSTRACT

An overcurrent trip system including a rectifier which derives its current from current carrying lines to be protected and a voltage regulator for controlling the rectified voltage. The trip network of the system responds to a overcurrent condition by outputting a signal to the regulator for increasing output voltage, which in turn effects tripping of a circuit breaker.

7 Claims, 1 Drawing Figure

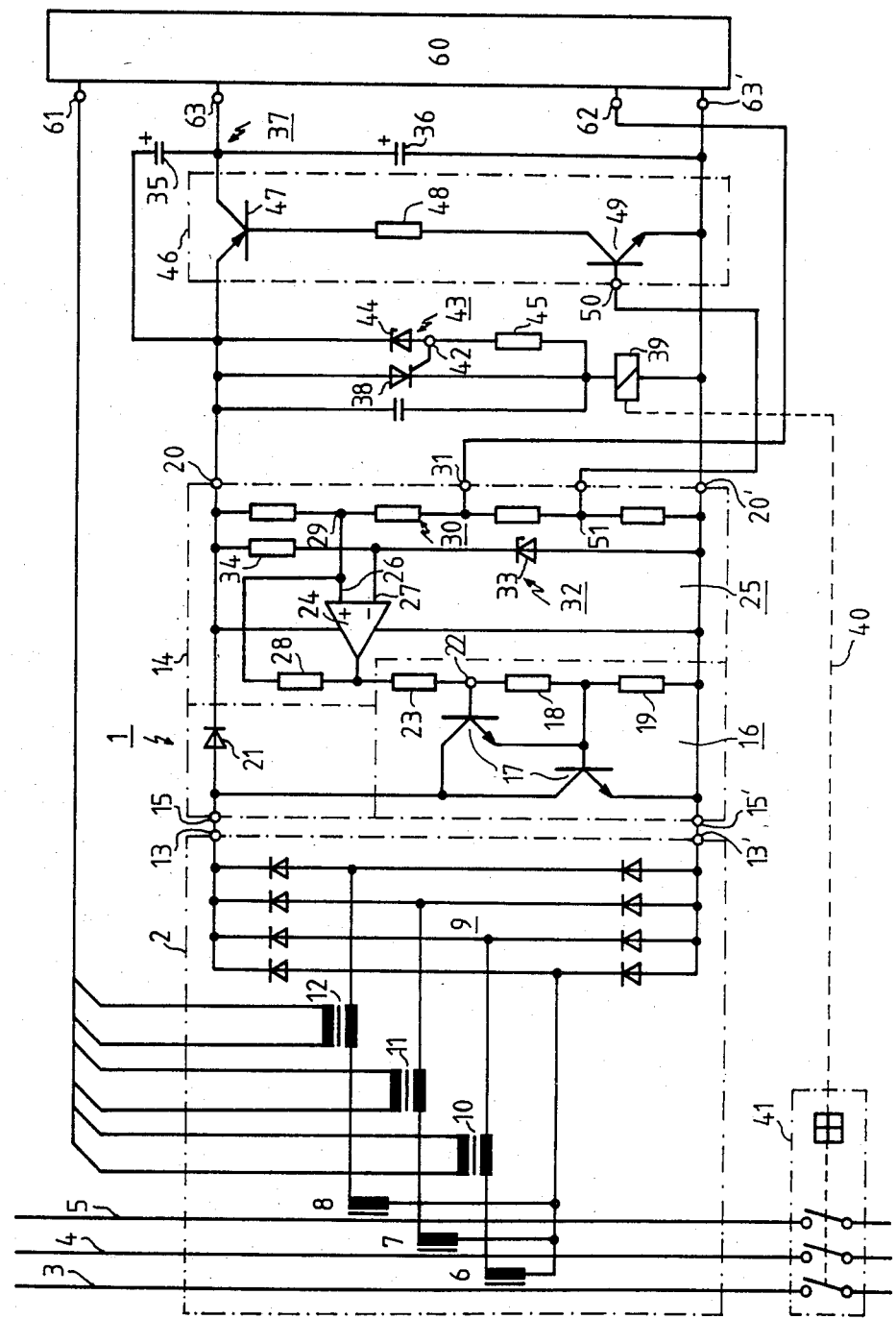

POWER SUPPLY FOR OVERCURRENT CIRCUIT TRIP SYSTEM

BACKGROUND OF THE INVENTION

1. Field of the Invention

The present invention relates to electrical power supplies, and more specifically to an improved power supply for an overcurrent trip system.

2. Description of the Prior Art

A power supply for an overcurrent circuit trip system, for instance of the type shown in U.S. Pat. No. 4,271,447, contains a device to receive and rectify line currents whereby current transformers coupled to the lines are connected to a full wave rectifier circuit. The DC output of the rectifier circuit is connected through a sensing resistor to the input side of a voltage regulator which provides a controlled reference voltage, the voltage regulator containing an adjustable potentiometer. Two charging capacitors are connected to the output of the voltage regulator to provide capacitive storage. A trip network of a known type is provided for outputting a trip signal for initiating the tripping action. Also connected to the output side of the voltage regulator is the series combination of a control switch and the coil of a release magnet as, for example, is disclosed by U.S. Pat. No. 4,274,121. To control the line current, a release circuit is connected to the adjusted output of a sensing resistance which, in turn, will trigger the release signal. A control switch is also connected to receive the release signal. Such power supply systems typically provide power for the operating trip network, as well as the energy for tripping the releasing magnet.

It will accordingly be understood that an object of the invention is to provide a power supply for an overcurrent circuit trip system which provides a low-loss supply for the release circuit, and guarantees that the release magnet will operate with the shortest possible reaction time.

SUMMARY OF THE INVENTION

Briefly stated, in accordance with one aspect of the invention the foregoing object is achieved by providing a power supply for an overcurrent trip system of the type described including a rectifier stage for deriving rectified current from the lines to be controlled and a voltage regulator for outputting an adjustable voltage signal. The power supply further includes a control input for varying the voltage value which is produced at the output of the trip unit, and a release control switch for energizing a release mechanism which responds to a change in voltage of the capacitive storage stage. A trip network produces an output signal which is applied to the control input of the voltage regulator to produce a change in output voltage, which in turn actuates the release control switch.

In another embodiment of the inventive power supply system, the capacitive storage stage consists of only one capacitor. A second capacitor is connected across the power supply terminals of the trip network. As soon as a second controllable switch disconnects the trip network from the output of the voltage regulator, the capacitor of the capacitive storage stage is charged to the higher voltage while the trip network is fed for some time from the energy of the second capacitor. For reasons of economy it would be advantageous to use two capacitors in series for capacitive storage, one of which is connected in parallel to the second controllable switch. But then the two capacitors, in series, must each have a larger capacity in comparison to a capacitive storage consisting of a single capacitor in order to have an equivalent total capacitance. However, after opening the second controllable switch, each capacitor will be recharged with a part of the increased voltage appearing at the output of the voltage regulator. Therefore capacitors with less dielectric strength may be used.

In a further developed embodiment of the invention additional, intermediary current transformers are added in the rectifier stage. The additional transformers are connected to the secondary side of the original current transformers. The primary windings of the intermediary current transformers are connected to the inputs of the rectifier stage. Their secondary windings are connected to the measuring input of the trip network, the DC output of the rectifier stage being directly connected to the voltage regulator. The current path of the individual intermediary current transformers exhibits particularly low resistivity, so that the capacitive storage stage will be quickly charged to the higher voltage upon the production of a release signal at the output of the trip network.

The magnitude of the measuring voltage at the output of each intermediary current transformer is determined by the transformation ratio of the transformer. In a presently-preferred design of the inventive power supply system which is particularly advantageous because of its simplicity, the control switch is a thyristor. The voltage-responsive threshold circuit is a series circuit consisting of a zener diode and a resistor, the junction of the zener diode and the resistor being connected to the gate of the thyristor. A simple and cost-effective construction of the voltage regulator can furthermore be obtained when the reference value adjustment means comprises a comparator with one of its inputs connected to the tap of a voltage divider which in turn is connected to the output of the voltage regulator, the other input of the comparator being connected to a reference voltage source. The output of the comparator is connected to the input of a controlled switching circuit which forms the output stage of the voltage regulator.

BRIEF DESCRIPTION OF THE DRAWING

While the specification concludes with claims particularly pointing out and distinctly claiming the subject matter which is regarded as the invention, it is believed that the invention will be better understood from the following description of a preferred embodiment, taken in conjunction with the accompanying drawing in which the figure is a schematic diagram of an overcurrent trip system utilizing principles of the invention.

DESCRIPTION OF A PREFERRED EMBODIMENT

The present invention concerns a power supply for an overcurrent circuit trip system comprising a magnetic release and a trip network with an output for providing release signal, and circuit to receive and rectify line currents in an electrical power installation under supervision. The DC output of the rectifying circuit supplies a voltage regulator having an adjustment for the desired or reference value and the output of which is connected to a capacitive storage stage. Parallel to this is a release control switch, with the coil of the release magnet connected in series therewith. In one preferred embodiment of the inventive power supply system a second, controllable switch is connected to the output of the voltage regulator. The control input of the voltage regulator is connected to the output of the trip network. Thus, a further shortening of the release time is achieved. As soon as a release signal appears at the output of the trip network, the second controllable switch disconnects the trip network from the power supply so that the total energy supplied by the voltage regulator is available for a quick charge of the capacitive storage stage to a higher voltage.

Referring now to the Figure, a power supply circuit generally indicated at 1 comprises a rectifier stage 2 to receive and rectify conductor currents, and a voltage regulator stage 14 for providing a supply voltage of a desired value. Each conductor 3, 4 and 5 is provided with a current transformer 6, 7 and 8, respectively. The secondary windings of current transformers 6, 7 and 8 are star-connected, the star point being connected to the rectifier circuit 9. The outputs of the current transformers extend through the primary windings of intermediary current transformers 10,11 and 12 and are connected to the other inputs of rectifier circuit 9.

The rectifier circuit is a bridge-type circuit whereby each of the inputs is connected in the usual manner between two diodes. The rectifier circuit is provided with DC output terminals 13 and 13'. Voltage regulator stage 14 is connected to rectifier circuit 9 by coupling input terminals 15 and 15' to DC outputs 13 and 13' respectively. The voltage regulator 14 is of the parallel switching type and includes a controlled switching arrangement 16 consisting of two transistors arranged as a Darlington pair 17, and two resistors 18 and 19 which are in turn parallel to the base- emitter paths of the transistors of the Darlington pair. The collector-emitter path of the Darlington pair 17 constitutes the input of the voltage regulator. The output terminal of voltage regulator 14 is connected through a diode 21 to input terminal 13 so that energy flows only from the input of the voltage regulator to its output.

The base connection of the Darlington pair constitutes the control input 22 of a controlled switching circuit 16 comprising the Darlington pair and associated resistors and is connected through a current limiting resistor 23 to the output of a comparator 24 which is a component of a voltage level adjusting circuit generally designated 25. The comparator 24 consists of an operational amplifier with non-inverting and inverting inputs 26 and 27 respectively. The non-inverting input of the comparator is connected through a feedback resistor 28 to the output of the comparator and is further connected to a tap 29 of a voltage divider 30. Voltage divider 30 consists of a series combination of several resistors connected across the outputs 20, 20' of the voltage regulator. A second tap of voltage divider 30 constitutes the control input 31 of the voltage adjusting circuit 25. The inverting input of comparator 24 is connected to a voltage reference source 32 consisting of a zener diode 33 and resistor 34 coupled across the output terminals of the voltage regulator. Further connected to the output of voltage regulator 14 is a capacitive storage stage 37, which comprises two series-connected capacitors 35 and 36. A release control switch comprising thyristor 38 is connected in series with the coil of a release magnet 39. The release magnet is connected through an appropriate mechanical linkage 40 to a circuit breaker 41 arranged in series with conductors 3, 4 and 5 which are carrying the current to be controlled. Release control switch 38, consisting of a thyristor whose gate connection forms a control input 42, is equipped with a threshold circuit 43 for responding to the voltage of the capacitive storage stage 37 when it exceeds a preset, threshold value. Circuit 43 is formed by the series connection of a zener diode 44 and resistor 45, whereby the connecting point of the zener diode and the resistor is connected to the gate connection of the thyristor so that resistor 45 is between the gate and the cathode of the thyristor. The other connection of zener diode 44 is connected to the anode of thyristor 38.

Coupled to the power supply stage 1 of the overcurrent release trip unit is a trip network 60 for the control of the current in conductors 3, 4, 5. The trip network is provided with a number of measurement inputs, collectively designated 61, and an output terminal 62 for outputting a trip signal. The measurement inputs 61 of trip network 60 are connected to the outputs of the intermediate current transformers 10, 11 and 12, which generate measuring voltages proportional to the conductor currents to be controlled. Output 62 of trip network 60 is connected to control input 31 of the voltage regulator for amplifying the control voltage.

The energy for trip network 60 is provided by power supply circuit 1, further controlled by a second controlled switch 46 coupled in series between the output of voltage regulator 14 and the current supply terminals 63, 63' of the trip network. The switching path of the switch is constituted by the emitter-collector circuit of a transistor 47. For control of the transistor 47, its base is connected to a resistor 48 which in turn is connected to the collector-emitter path of another transistor 49. The base of the other transistor 49 constitutes the control input 50 of the controlled switch 46 and is connected to tap 51 of voltage divider 30. Output 62 of the trip circuit is coupled to another tap 31 of the voltage divider.

At the secondary outputs of current transformers 6,7 and 8, voltages are produced which are proportional to the conductor currents, and in turn from which an unregulated DC voltage is generated in rectifier circuit 9. Voltage regulator 14 produces a regulated voltage from the unregulated DC voltage at its input. The value of the output voltage is determined by the divider relationship at the voltage tap 29 of the voltage divider 30 and by the zener voltage of zener diode 33. As soon as the voltage at the output of the voltage regulator 14 exceeds the adjusted setpoint value, a positive voltage differential arises between the non-inverting and inverting inputs of comparator 24. As a consequence the comparator generates a positive voltage at its output, which in turn effects a voltage drop across resistors 18, 19, and 23, which control the Darlington pair 17. The Darlington pair short-circuits the input terminals of the voltage regulator 14, and as a consequence the voltage drops across its output terminals 20, 20' because capacitor 36 of the capacitive storage circuit 37 discharges to supply the trip network 60. If the voltage at the output of voltage regulator drops, this time below the desired value, the voltage differential at the output of the comparator will become zero because of the negative voltage between its inverting and non-inverting inputs 26 and 27. Consequently the voltages at the resistances 18, 19 become zero, so that the Darlington pair 17 reverts to its blocking condition and the capacitor 36 is recharged.

Upon the occurrence of a trip signal at output 62 of trip network 60 this output becomes low-resistive and produces an effective short circuit across voltage divider 30 between its control input 31 and terminal 20' of the voltage regulator. The consequent change of the relationship of voltages across the resistors of voltage divider 30 effects an increase in the desired value of the output voltage of voltage regulator 14. With the triggering of the release signal at output 62 of trip network 60, the base-emitter path of transistor 49 is simultaneously short circuited, so that the conductance of transistor 49 is substantially reduced to thereby reduce the base current of the series transistor 47 in such a way that the latter reverts to a blocking condition and interrupts the flow of power to the trip network 60. Capacitors 35 and 36 of the capacitive storage stage 37 will be recharged by the increased voltage being produced by voltage regulator 14.

The value of capacitor 36 is selected to be larger in comparison to that of capacitor 35, so that voltage at capacitor 36 increases slightly whereas capacitor 35 is recharged to a voltage level which corresponds essentially to the voltage difference representing the increased desired voltage value before the triggering of the release signal. As soon as the increased voltage at the capacitive storage stage 37 exceeds a threshold value preset by zener diode 44, the zener diode becomes conductive and thyristor 38 is triggered. The capacitors 35 and 36 of the capacitive storage stage 37 now discharge through thyristor 38 and the coil of the trip magnet 39, which will react safely and reliably because of the high discharge current and will actuate circuit breaker 41 through linkage 40 to isolate conductors 3, 4, and 5.

With the present invention the reference value adjustment of the power supply circuit has a control input connected to the output of a trip network, and the release control switch is coupled to a threshold circuit responsive to the voltage on the capacitive storage stage when the voltage across the latter exceeds a preset threshold value. The output of the threshold circuit is connected to the control input of the release control switch. The inventive power supply system has the advantage that the output voltage of the voltage regulator stage therefore is controllable independently of the output of the release circuit, so that an adjustment of the output voltage to accomodate the energy requirement of the release circuit and the magnetic release is possible. To supply the release circuit, the voltage output of the voltage regulator is adjusted to a low value so that the power loss through the release circuit is low; a release signal at the output of the trip circuit effects an increase of the reference voltage at the output of the voltage regulator and therewith an increase of the voltage across the capacitive storage stage, so that a large amount of energy for the energization of the release magnet becomes available to ensure a rapid response.

A further advantage of the inventive power supply device consists in the fact that operation of the release control switch is effected by a threshold circuit responsive to the voltage at the capacitive storage stage when it exceeds a preset value. Based on this, the actuation of the release magnet occurs only when a requisite voltage from the capacitive storage stage is available at the output of the voltage regulator. Thus a safe response of the release magnet is assured. The response time of the release magnet by increasing output voltage is considerably improved compared to the time which is required for the recharging the capacitive storage stage to obtain an increased output voltage.

As will be evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed as new and desired to be secured by Letter Patent of the United States is:

1. In an overcurrent circuit trip system including a release magnet with a release magnet coil and a trip network, a power supply with an output for the triggering of a release signal; a rectifier circuit for the reception and rectification of conductor current in an electrical energy transmitting system to be controlled by said overcurrent trip system; a voltage regulator having a voltage adjustment; a capacitive storage stage coupled to the voltage regulator; and a series circuit comprising a release-control switch and the coil of the release magnet connected in parallel with the capacitive storage stage, comprising in combination:

voltage adjustment means having a control input which is connected with the output of the trip network for varying the voltage outputted by said voltage regulator;
   a control input connected to said release-control switch; and
   a threshold circuit coupled to the control input of said release control switch and to capacitive stage, responsive to a voltage arising across the capacitive storage stage generating an enabling signal when a preset value is exceeded to said control input of said release control switch enabling said switch and allowing current to flow to the release magnet coil.

2. A power supply according to claim 1, further including a second, controllable switch connected in series between the output of the voltage regulator and the trip network, said second, controllable switch having a input coupled to an output terminal of the trip network.

3. A power supply according to claim 2, wherein said capacitive storage stage comprises one capacitor; and a second capacitor connected between the voltage regulator and the trip network.

4. A power supply according to claim 2, wherein the capacitive storage stage comprises two capacitors connected in series, one of said capacitors being connected in parallel across the second, controllable switch.

5. A power supply according to claim 1, further comprising a plurality of current transformers connected with the a.c. inputs of said rectifier circuit and a plurality of intermediate transformers having primary windings connected in series with said a.c. inputs and having secondary windings for connection to a measuring input of the trip network, the d.c. output of said rectifier circuit being directly connected to the input of said voltage regulator.

6. A power supply device according to claim 1, wherein said release control switch is a thyristor having a gate and said threshold circuit comprises the series combination of a zener diode and a resistance, the junction of the zener diode and resistance being connected to the gate connection of the thyristor.

7. A power supply according to claim 1 further comprising a voltage divider connected across the output of said voltage regulator; a comparator having a first input of which is connected to a voltage tap of said voltage divider and a second input connected to a point of reference voltage; a control switching circuit having a control input and operating to control the output voltage of said voltage regulator; and means coupling the output of said comparator to the control input of said control switching circuit.

* * * * *